United States Patent
Horiguchi

(10) Patent No.: US 12,172,720 B2
(45) Date of Patent: Dec. 24, 2024

(54) BEHAVIOR CONTROL APPARATUS FOR VEHICLE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 237 days.

(21) Appl. No.: 18/055,930

(22) Filed: Nov. 16, 2022

(65) Prior Publication Data
US 2023/0159096 A1  May 25, 2023

(30) Foreign Application Priority Data

Nov. 24, 2021 (JP) ................. 2021-190403

(51) Int. Cl.
*B62D 6/00* (2006.01)
*B62D 15/02* (2006.01)

(52) U.S. Cl.
CPC ............. *B62D 6/00* (2013.01); *B62D 15/021* (2013.01)

(58) Field of Classification Search
CPC ...... B62D 15/021; B62D 15/025; B62D 6/00; B62D 6/003
See application file for complete search history.

(56) References Cited

U.S. PATENT DOCUMENTS

| | | | | |
|---|---|---|---|---|
| 5,710,705 A | * | 1/1998 | Eckert | B60T 8/17551 701/72 |
| 6,360,150 B1 | * | 3/2002 | Fukushima | B60T 8/17552 701/41 |
| 6,640,173 B1 | * | 10/2003 | Zheng | B60T 8/1755 701/41 |
| 9,415,803 B2 | * | 8/2016 | Takeda | B62D 5/04 |
| 11,597,381 B2 | * | 3/2023 | Kashiwamura | B60W 10/04 |
| 2003/0097206 A1 | * | 5/2003 | Matsumoto | B60T 8/17557 701/1 |
| 2003/0169003 A1 | * | 9/2003 | Cao | B62D 6/008 318/432 |
| 2005/0125153 A1 | * | 6/2005 | Matsumoto | B60T 8/17557 701/41 |
| 2006/0142921 A1 | * | 6/2006 | Takeda | B60W 30/12 701/70 |
| 2007/0225914 A1 | * | 9/2007 | Kawazoe | B62D 15/025 340/436 |

(Continued)

FOREIGN PATENT DOCUMENTS

JP 2015-143483 A 8/2015

*Primary Examiner* — Carl C Staubach
(74) *Attorney, Agent, or Firm* — Rimon P.C.

(57) ABSTRACT

A behavior control apparatus for a vehicle includes a vehicle speed detector, a curvature setting unit, a steering angle detector, a yaw rate detector, a deceleration rate detection unit, a target yaw rate setting unit, a vehicle behavior determination unit, and a vehicle behavior controller. The vehicle behavior controller includes a grip restored vehicle speed estimation unit, an estimated yaw rate setting unit, a grip restored target yaw rate setting unit, and a steering control unit. The steering control unit makes a steering control including allowing a yaw rate of the vehicle to settle at a grip restored target yaw rate at which tire grip is restored, on the basis of a difference between an estimated yaw rate and the grip restored target yaw rate.

17 Claims, 7 Drawing Sheets

(56) References Cited

U.S. PATENT DOCUMENTS

| | | | |
|---|---|---|---|
| 2012/0283912 A1* | 11/2012 | Lee | B62D 1/286 |
| | | | 701/41 |
| 2016/0107682 A1* | 4/2016 | Tan | B60W 30/18163 |
| | | | 701/41 |
| 2021/0188252 A1* | 6/2021 | Lu | B60W 40/12 |
| 2022/0080954 A1* | 3/2022 | Raffone | B60W 30/12 |
| 2022/0111895 A1* | 4/2022 | Schumann | B62D 15/025 |
| 2023/0013377 A1* | 1/2023 | Horiguchi | B60W 50/10 |
| 2023/0037354 A1* | 2/2023 | Flumeri | B60T 8/172 |
| 2023/0051786 A1* | 2/2023 | Flumeri | B60L 15/2036 |
| 2023/0068573 A1* | 3/2023 | Tominaga | B62D 5/0463 |
| 2023/0264739 A1* | 8/2023 | Vogt | B62D 7/159 |
| | | | 701/41 |
| 2023/0398980 A1* | 12/2023 | Horiguchi | B60W 50/087 |

* cited by examiner

BEHAVIOR CONTROL APPARATUS FOR VEHICLE

CROSS-REFERENCE TO RELATED APPLICATIONS

The present application claims priority from Japanese Patent Application No. 2021-190403 filed on Nov. 24, 2021, the entire contents of which are hereby incorporated by reference.

BACKGROUND

The disclosure relates to a behavior control apparatus for a vehicle that attains stabilization of vehicle behavior on the occasion of restoration of tire grip after the vehicle exhibits a tendency to understeer or a tendency to oversteer.

Skid prevention devices have been known that control vehicle behavior safely in a case where vehicle behavior becomes unstable by, for example, a slip in traveling along, for example, a curved road. Skid prevention is also referred to as vehicle dynamics control (VDC), or electronic stability control (ESC). Such a skid prevention device detects a tendency to understeer or a tendency to oversteer, in a vehicle traveling along a curved road. In the following, the tendency to understeer and the tendency to oversteer are collectively referred to as "yaw behavior". Upon detecting the tendency to understeer or the tendency to oversteer, the skid prevention device imparts an appropriate deceleration rate to a driving wheel, to suppress unstable behavior.

For example, upon detecting the vehicle in the tendency to understeer, the skid prevention device imparts a braking force to a rear wheel on inner side of cornering in a four-wheel drive vehicle, to bring the vehicle into the tendency to oversteer. Upon detecting the vehicle in the tendency to oversteer, the skid prevention device imparts a braking force to a front wheel on outer side of cornering in a four-wheel drive vehicle, to bring the vehicle into the tendency to understeer.

SUMMARY

An aspect of the disclosure provides a behavior control apparatus for a vehicle. The behavior control apparatus includes a vehicle speed detector, a curvature setting unit, a steering angle detector, a yaw rate detector, a deceleration rate detection unit, a target yaw rate setting unit, a vehicle behavior determination unit, and a vehicle behavior control unit. The vehicle speed detector is configured to detect a vehicle speed of the vehicle. The curvature setting unit is configured to set a curvature on the basis of a track to be traveled by the vehicle. The steering angle detector is configured to detect a steering angle of a steering wheel of the vehicle. The yaw rate detector is configured to detect a yaw rate that acts on the vehicle. The deceleration rate detection unit is configured to detect a deceleration rate from a change in the vehicle speed. The target yaw rate setting unit is configured to set a target yaw rate on the basis of the vehicle speed and the curvature. The vehicle behavior determination unit is configured to determine whether the vehicle is taking yaw behavior in a tendency to oversteer or a tendency to understeer, from a difference between the yaw rate and the target yaw rate. The vehicle behavior control unit is configured to control behavior of the vehicle on the condition that the vehicle behavior determination unit determines that the vehicle is taking the yaw behavior. The vehicle behavior control unit includes a grip restored vehicle speed estimation unit, an estimated yaw rate setting unit, a grip restored target yaw rate setting unit, and a steering control unit. The grip restored vehicle speed estimation unit is configured to estimate a tire grip restored vehicle speed at which tire grip is restored, on the basis of the deceleration rate. The estimated yaw rate setting unit is configured to set an estimated yaw rate that acts on the vehicle, on the basis of the vehicle speed and the steering angle, on the occasion that the vehicle speed lowers to the tire grip restored vehicle speed. The grip restored target yaw rate setting unit is configured to set a grip restored target yaw rate at which the tire grip is restored, on the basis of the curvature and the tire grip restored vehicle speed. The steering control unit is configured to make a steering control including allowing the yaw rate of the vehicle to settle at the grip restored target yaw rate, on the basis of a difference between the estimated yaw rate and the grip restored target yaw rate.

An aspect of the disclosure provides a behavior control apparatus for a vehicle. The behavior control apparatus includes a vehicle speed sensor, a steering angle sensor, a yaw rate sensor, and circuitry. The vehicle speed sensor is configured to detect a vehicle speed of the vehicle. The steering angle sensor is configured to detect a steering angle of a steering wheel of the vehicle. The yaw rate sensor is configured to detect a yaw rate that acts on the vehicle. The circuitry is configured to: set a curvature on the basis of a track to be traveled by the vehicle; detect a deceleration rate from a change in the vehicle speed; set a target yaw rate on the basis of the vehicle speed and the curvature; determine whether the vehicle is taking yaw behavior in a tendency to oversteer or a tendency to understeer, from a difference between the yaw rate and the target yaw rate; and control behavior of the vehicle on the condition that the circuitry determines that the vehicle is taking the yaw behavior. The circuitry is configured to: estimate a tire grip restored vehicle speed at which tire grip is restored, on the basis of the deceleration rate; set an estimated yaw rate that acts on the vehicle, on the basis of the vehicle speed and the steering angle, on the occasion that the vehicle speed lowers to the tire grip restored vehicle speed; set a grip restored target yaw rate at which the tire grip is restored, on the basis of the curvature and the tire grip restored vehicle speed; and make a steering control including allowing the yaw rate of the vehicle to settle at the grip restored target yaw rate, on the basis of a difference between the estimated yaw rate and the grip restored target yaw rate.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Yaw behavior, i.e., a tendency to understeer and a tendency to oversteer, occurs in traveling along a curved road on a road surface having a low coefficient of friction, or a low-u road. However, even if a skid prevention device operates, it is difficult to suppress the yaw behavior sufficiently because a grip force of a tire is small.

In traveling along a low-u curved road, when a driver additionally turns a steering wheel to make the vehicle travel along a track, a vector sum of a longitudinal force and a lateral force generated on a tire of a front wheel as a steering wheel reaches a limit of a friction circle, and thereupon, the yaw rate is saturated. This makes it difficult to make the vehicle travel along the track, resulting in the tendency to understeer or the tendency to oversteer.

Figure 7A:
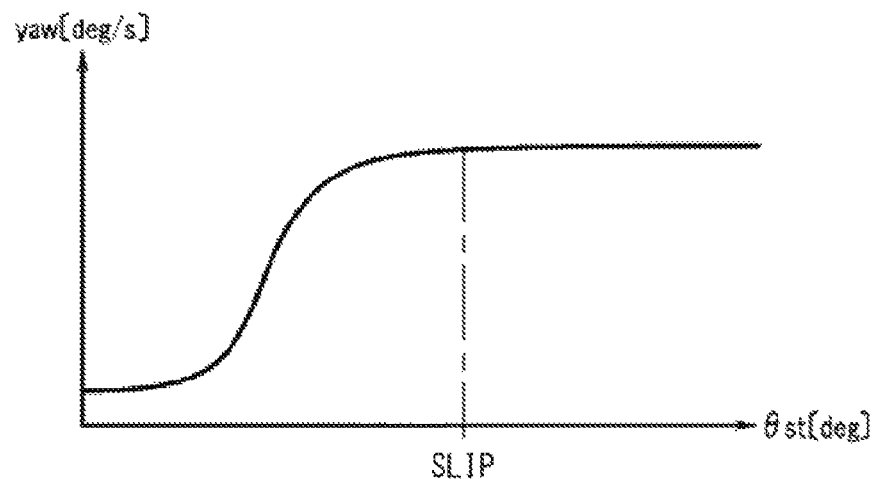
FIG. 7A is a characteristic diagram that illustrates relation between a yaw rate and a steering wheel angle in a case where the steering wheel is additionally turned in the tendency to understeer.

When the driver recognizes the vehicle in the tendency to understeer, as illustrated in FIG. 7A, the driver turns the steering wheel even more additionally, trying to return the vehicle to the original track. In traveling along the low-µ curved road, when the driver recognizes the vehicle in the tendency to oversteer, the driver turns the steering wheel back, trying to return the vehicle to the original track.

Figure 7B:
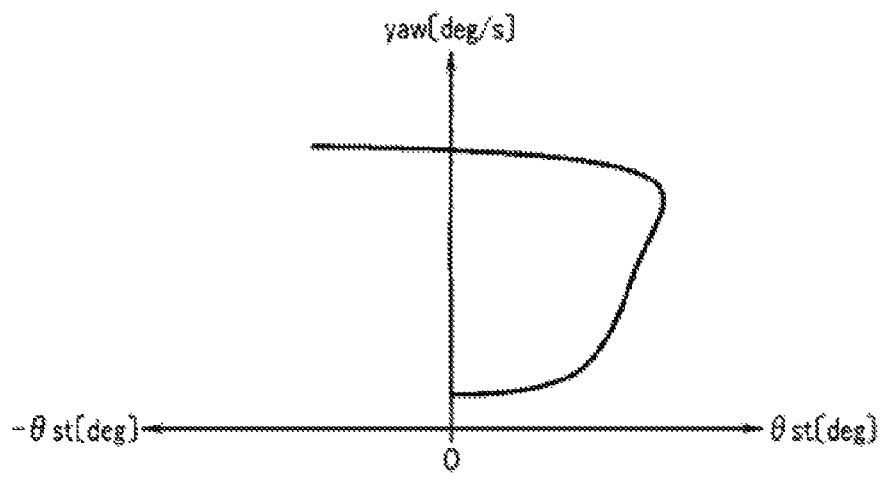
FIG. 7B is a characteristic diagram that illustrates the relation between the yaw rate and the steering wheel angle in a case where the steering wheel is turned back in the tendency to oversteer.

However, as illustrated in FIG. 7A, in a case where the vehicle understeers, even if the driver turns the steering wheel back to increase a steering angle θst, the vehicle becomes unsteerable because a yaw rate "yaw" [deg/s] is saturated. As illustrated in FIG. 7B, in a case where the vehicle oversteers, even if the driver turns the steering wheel back to bring the steering angle θst into a counter-steer state, the vehicle becomes unsteerable because the yaw rate "yaw" [deg/s] is saturated.

Generally, in a case where a driver recognizes a vehicle in the tendency to understeer or the tendency to oversteer, the driver releases an accelerator pedal. This causes torque reduction because of travel resistance by coasting. Even if the driver is stepping on the accelerator pedal, a traction control system (TCS) is brought into operation and carries out a torque reduction control.

In a case where a speed lowers, with the yaw rate saturated, a grip force of a tire of a driving wheel is restored at a certain speed or lower. At this occasion, if the steering wheel is additionally steered with respect to the track, or the steering wheel is steered back with respect to the track, the restoration of the grip force of the tire causes unstable vehicle behavior.

Thus, for example, Japanese Unexamined Patent Application Publication (JP-A) No. 2015-143483 describes a technique in which, in a case where a driver tries to additionally turn a steering wheel on a low-µ road, an assist motor of an electric power steering apparatus is allowed to generate a steering reaction force that acts against a steering force by the driver. This inhibits the driver from additionally turning the steering wheel.

However, when the vehicle is in the tendency to understeer, and the driver tries to additionally turn the steering wheel to return the vehicle to the original track, the technique described in JP-A No. 2015-143483 ends in inhibiting the driver from additionally turning the steering wheel, against the driver's intention, and the vehicle remains in the tendency to understeer. This makes the driver feel uncomfortable or anxious.

It is desirable to provide a behavior control apparatus for a vehicle that makes it possible to obtain stable vehicle behavior after restoration of a grip force of a tire on the occasion that a driver additionally turns a steering wheel or turns the steering wheel back, without making the driver feel uncomfortable or anxious.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
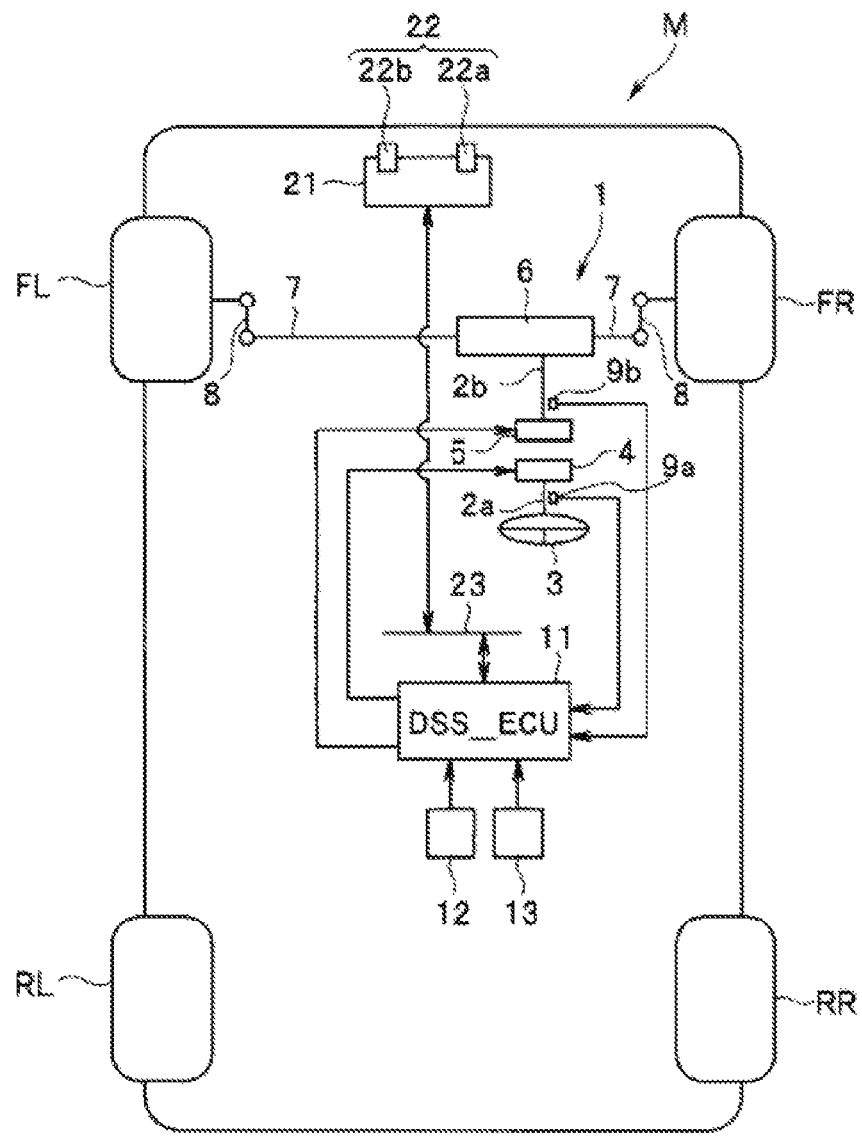
FIG. 1 is a schematic configuration diagram of a behavior control apparatus mounted on a vehicle.

In FIG. 1, a vehicle M is a four-wheel drive vehicle. A left front wheel FL and a right front wheel FR, and a left rear wheel RL and a right rear wheel RR serve as driving wheels. The left front wheel FL and the right front wheel FR serve as steering wheels. It is to be noted that left and right directions of steering of the front wheels FL and FR, and yaw rates of the front wheels FL and FR in the left and right directions have different signs. In the following, for the purposes of convenience, the directions of steering and the yaw rates of the front wheels FL and FR are represented by absolute values.

A steering device 1 employs a steer-by-wire system in which a steering shaft 2a and a pinion shaft 2b are not mechanically coupled. On a base end of the steering shaft 2a, a steering wheel 3 is provided. The steering wheel 3 is operated by a driver who drives the vehicle M. On a tip of the steering shaft 2a, a reaction force motor 4 is provided. The reaction force motor 4 is configured to generate a pseudo-steering reaction force in response to a steering operation by the driver. To a base end of the pinion shaft 2b, a steering motor 5 is fixed. The pinion shaft 2b is independent of the steering shaft 2a. The steering motor 5 is basically configured to steer the pinion shaft 2b in synchronization with rotation of the steering shaft 2a. It is to be noted that the reaction force motor 4 and the steering motor 5 are fixed to a vehicle body frame.

A tip of the pinion shaft 2b is coupled to a steering mechanism 6 such as a rack and pinion mechanism. To the steering mechanism 6, the left and right front wheels FL and FR are coupled, through tie rods 7 and front knuckles 8.

The reaction force motor 4 and the steering motor 5 mentioned above are subjected to a steering control on the occasion that the driver operates the steering wheel 3 by a driver assistance control unit 11, or a DSS (Driving Support System)_ECU 11. To input side of the DSS_ECU 11, for example, a first steering angle sensor 9a, a second steering angle sensor 9b, a yaw rate sensor 12, and a vehicle speed sensor 13 are coupled. The first steering angle sensor 9a, the second steering angle sensor 9b, the yaw rate sensor 12, and the vehicle speed sensor 13 are configured to detect various parameters to be involved in a behavior control by automatic steering. The first steering angle sensor 9a is provided on the steering shaft 2a and configured to detect an angle of turn of the steering wheel 3, i.e., a steering wheel angle. The second steering angle sensor 9b is configured to detect a rotation angle of the pinion shaft 2b, i.e., a steering angle. In one embodiment of the disclosure, the second steering angle sensor 9b may serve as a "steering angle detector". The yaw rate sensor 12 is configured to detect a yaw rate that acts on the vehicle M. In one embodiment of the disclosure, the yaw rate sensor 12 may serve as a "yaw rate detector". The vehicle speed sensor 13 is configured to detect a vehicle speed of the vehicle M. In one embodiment of the disclosure, the vehicle speed sensor 13 may serve as a "vehicle speed detector".

A forward view recognition device 21 is provided in a front portion of a cabin of the vehicle M. The forward view recognition device 21 is configured to perform image processing on an image of traveling environment data ahead of the vehicle. The image of the travel environment data is captured by an on-vehicle camera 22. The on-vehicle camera 22 includes a stereo camera including a main camera 22a and a sub camera 22b. For example, in a lane keeping control in the automated driving, the forward view recognition device 21 is configured to recognize lane lines that define left and right edges of a traveling lane, and obtain the midpoint between the lane lines, i.e., the center of the lane.

The forward view recognition device 21 may include anything that is able to recognize, at least, the right and left lane lines. The forward view recognition device 21 may include, for example, an ultrasonic sensor, millimeter-wave radar, or LiDAR (Light Detection and Ranging), instead of the stereo camera. Alternatively, the forward view recognition device 21 may include a combination of an ultrasonic sensor, millimeter-wave radar, or LiDAR, and a monocular camera.

The forward view recognition device 21 and the DSS_ECU 11 are bidirectionally communicably coupled to each other through an in-vehicle communication line 23 such as CAN (Controller Area Network). The forward view recognition device 21 and the DSS_ECU 11 may include, for example, a microcontroller including a CPU (Central Processing Unit), a RAM (Random Access Memory), a ROM (Read Only Memory), a rewritable nonvolatile memory such as a flash memory or an EEPROM (Electrically Erasable Programmable Read Only Memory), and peripheral units. The ROM holds, for example, programs and fixed data to be involved in processing to be carried out by the CPU. The RAM serves as a work area for the CPU. The RAM temporarily holds various kinds of data in the CPU. The CPU is also called a MPU (Micro Processing Unit) or a processor. Alternatively, a GPU (Graphics Processing Unit) or a GSP (Graph Streaming Processor) may be used instead of the CPU. In another alternative, the CPU, the GPU, and the GSP may be selectively combined for use.

In manual driving by the operation of the steering wheel 3 by the driver, the DSS_ECU 11 is configured to obtain reaction force torque on the basis of the steering wheel angle detected by the first steering angle sensor 9a, a steering wheel angular speed obtained by time differentiating the steering wheel angle, and the vehicle speed detected by the vehicle speed sensor 13. The reaction force torque corresponds to a steering reaction force normally received by the driver. The DSS_ECU 11 is configured to output a corresponding drive signal to the reaction force motor 4 to apply the steering reaction force to the steering shaft 2a.

In the steering control during the manual driving, first, the DSS_ECU 11 is configured to obtain a target steering angle corresponding to the steering wheel angle detected by the first steering angle sensor 9a. The DSS_ECU 11 is configured to output a drive signal corresponding to the target steering angle to the steering motor 5 to rotate the pinion shaft 2b, causing the steering mechanism 6 to operate to steer the left and right front wheels FL and FR as is predetermined. The left and right front wheels FL and FR serve as the steering wheels. Moreover, the DSS_ECU 11 is configured to read the steering angle detected by the second steering angle sensor 9b, and make a feedback control to settle the steering angle at the target steering angle.

In a case where the lane keeping control is in operation, the DSS_ECU 11 is configured to set a target track as a traveling track along the center between the left and right lane lines recognized by the forward view recognition device 21. The DSS_ECU 11 is configured to set a target steering angle to align the vehicle-widthwise center of the vehicle M with the target track. The DSS_ECU 11 is configured to output a drive signal corresponding to the target steering angle to the steering motor 5 to steer the left and right front wheels FL and FR as is predetermined. At this occasion, the DSS_ECU 11 is configured to make a feedback control to settle the steering angle detected by the second steering angle sensor 9b at the target steering angle.

Figure 5:
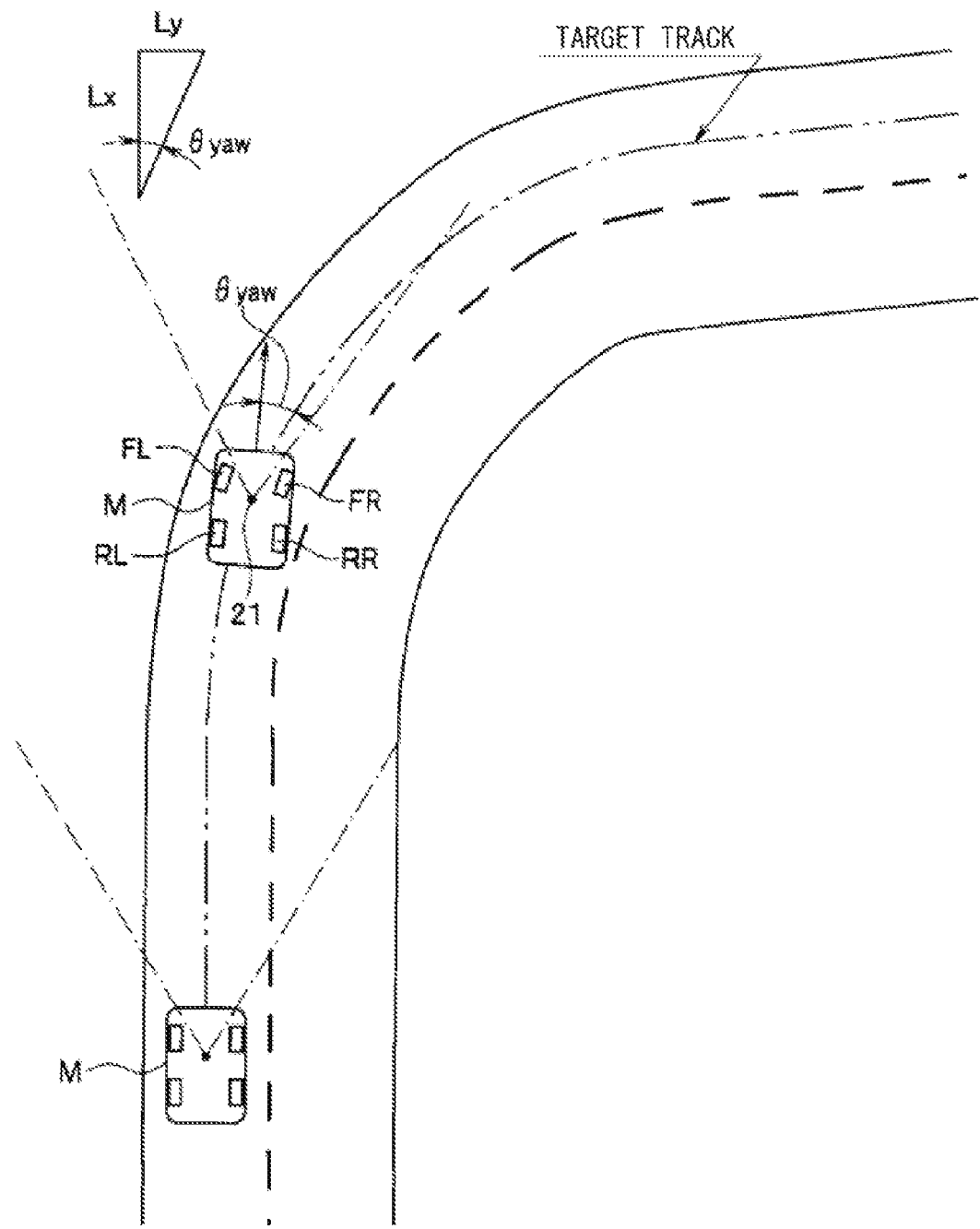
FIG. 5 is a diagram that illustrates a state in which the vehicle is traveling along a curved road in a tendency to understeer.

In a case where the vehicle M is traveling along a curved road and the vehicle M is brought into the tendency to understeer as illustrated in FIG. 5, the driver turns the steering wheel 3 inwardly of cornering, i.e., clockwise in the figure, trying to make the vehicle M travel along the target track even during the automated driving or during the lane keeping control.

Figure 6:
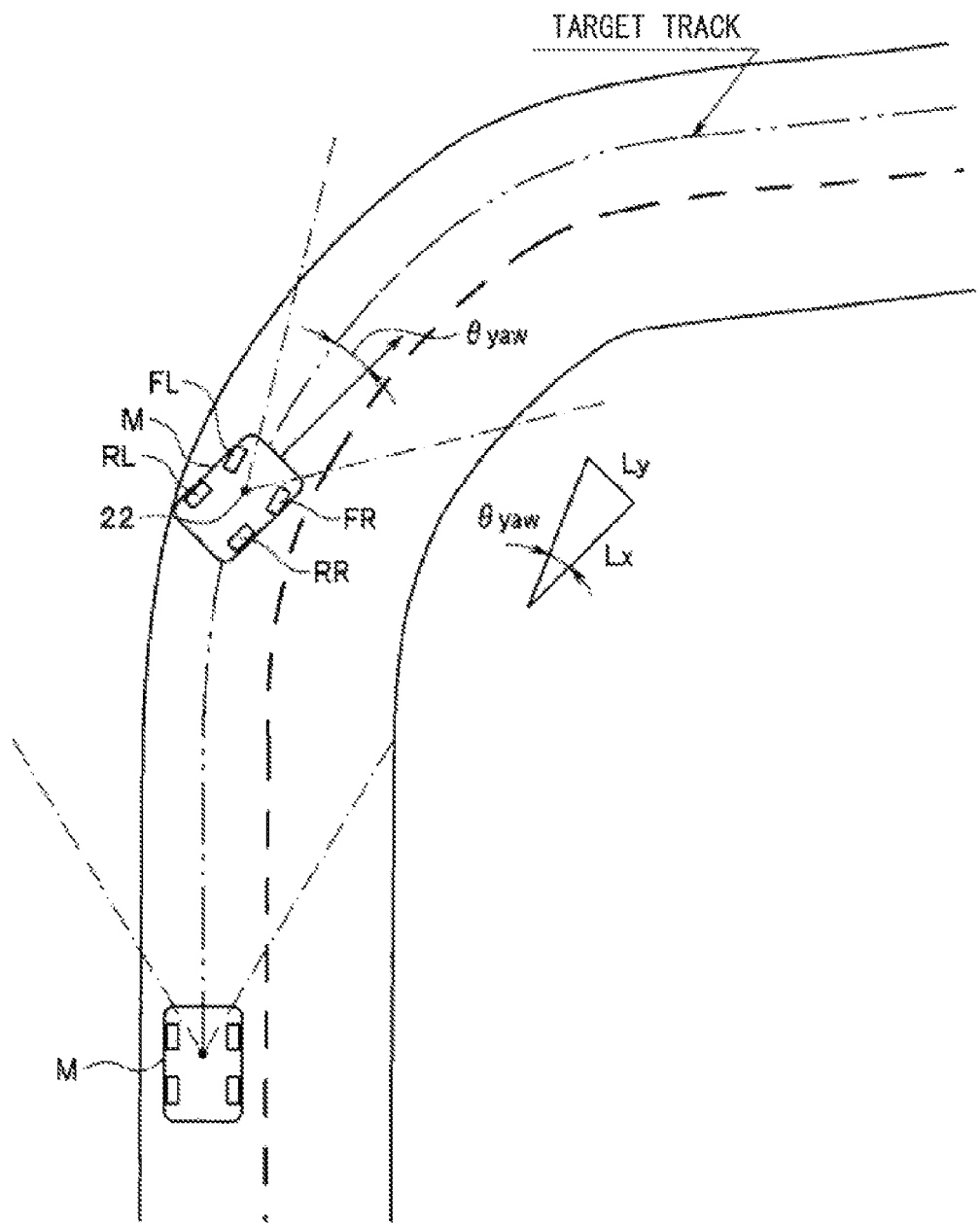
FIG. 6 is a diagram that illustrates a state in which the vehicle is traveling along a curved road in a tendency to oversteer.

Similarly, in a case where the vehicle M is traveling along a curved road and the vehicle M is brought into the tendency to oversteer as illustrated in FIG. 6, the driver turns the steering wheel 3 outwardly of cornering, i.e., counterclockwise in the figure, to counter-steer, trying to correct a posture of the vehicle M and make the vehicle M travel along the target track.

However, in a case where the vehicle M is cornering along a curved load at a high speed, or in a case where the vehicle M is cornering at a medium or low speed on a road surface of a low-u road, grip forces of tires of the left and right front wheels FL and FR are too small to be steered sufficiently. The left and right front wheels FL and FR serve as the steering wheels. Thus, the driver turns the steering wheel 3 even more additionally in the case of the tendency to understeer, or turns the steering wheel 3 back even more in the case of the tendency to oversteer, trying to correct the posture of the vehicle M.

At this occasion, because the driver releases the accelerator pedal, the vehicle M is gradually decelerated. Even if the driver is stepping on the accelerator pedal, a traction control system (TCS) is brought into operation, and a torque reduction control is carried out. The grip force of the tire is restored at a certain vehicle speed after deceleration. However, because the steering angles of the left and right front wheels FL and FR are considerably increased or decreased with respect to the target track, the restoration of the grip force of the tire suddenly destabilizes vehicle behavior.

The DSS ECU 11 is configured to estimate the vehicle speed at which the grip of the tire is restored by the deceleration from the yaw behavior, i.e., the tendency to understeer or the tendency to oversteer. On the occasion that the vehicle speed lowers to the estimated vehicle speed, the DSS_ECU 11 is configured to carry out the automatic steering, and restore the vehicle behavior to a stable state.

Figure 2:
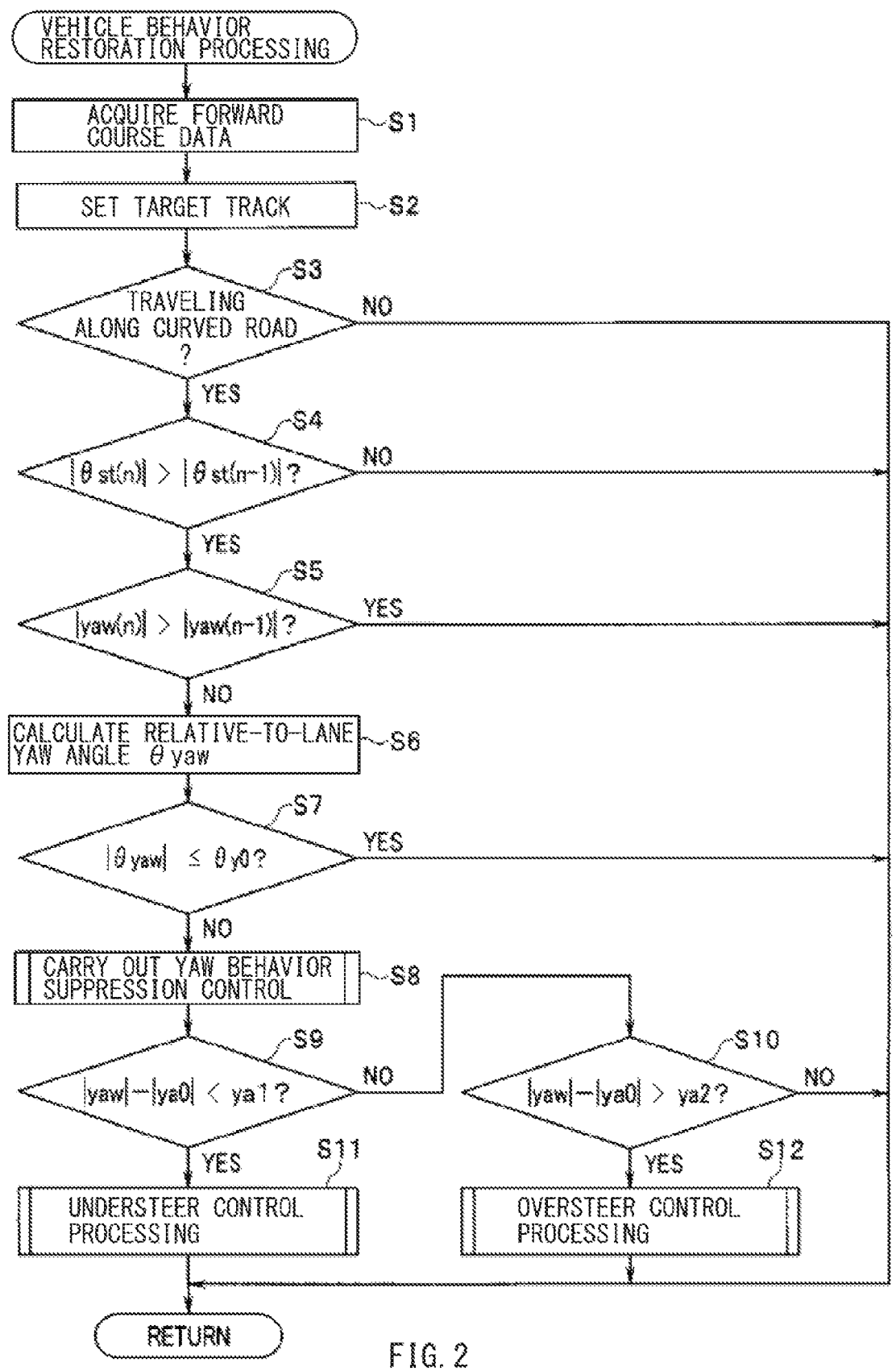
FIG. 2 is a flowchart of a routine of vehicle behavior restoration processing.

In one example, vehicle behavior restoration processing from understeering or oversteering by the automatic steering may be carried out in accordance with a routine of the vehicle behavior restoration processing illustrated in FIG. 2. The vehicle behavior restoration processing is carried out by the DSS_ECU 11.

This routine is carried out on every predetermined calculation cycle after a start-up of the system. First, in step S1, forward course data is acquired from the travel environment data ahead of the vehicle M. The travel environment data is obtained by predetermined image processing on the images captured by the on-vehicle camera 22 of the forward view recognition device 21. The forward course data includes the lane lines that define the left and right edges of the lane on which the vehicle M is traveling.

Thereafter, the flow proceeds to step S2, and the target track is set along the center between the left and right lane lines included in the forward course data. Because the target track includes a curvature, in one embodiment of the disclosure, the DSS_ECU 11 in step S2 may serve as a "curvature setting unit".

Thereafter, the flow proceeds to step S3, and it is checked whether or not the lane on which the vehicle M is currently traveling is a curved road. In checking whether or not the lane currently traveled is a curved road, for example, comparison is made between a curvature (1/R [m]) of the target track and a curved road determination curvature, i.e., a preset curvature for a determination of a curved road. In a case where the curvature of the target track is equal to or greater than the curved road determination curvature, it is determined that the lane currently traveled is a curved road. Alternatively, in a case where a navigation system is mounted on the vehicle M, road data regarding the road currently traveled by the vehicle M may be acquired from road map data, to determine whether or not the lane currently travelled is a curved road.

In a case with a determination that the vehicle M is traveling on a curved road, the flow proceeds to step S4. In a case with a determination that the vehicle M is traveling on a straight road, the routine is ended. In step S4, comparison is made between an absolute value $|\theta st(n)|$ of the current steering angle $\theta st(n)$ detected by the second steering angle sensor 9b and an absolute value $|\theta st(n-1)|$ of the steering angle $\theta st(n-1)$ detected in the previous calculation, to check whether or not the steering angle $\theta st$ is increased.

In a case with a determination that the steering angle is increased ($|\theta st(n)|>|\theta st(n-1)|$), it is determined that the vehicle M is traveling in a direction of a constant curvature from an entry to the curved road, and the flow proceeds to step S5. In a case with a determination that the steering angle $\theta st$ is constant or decreased ($|\theta st(n)|\leq|\theta st(n-1)|$), it is determined that the vehicle M is traveling from the curved road of the constant curvature toward an exit, and the routine is ended.

In step S5, comparison is made between an absolute value $|yaw(n)|$ of a current yaw rate $yaw(n)$ [deg/s] detected by the yaw rate sensor 12, and an absolute value $|yaw(n-1)|$ of a yaw rate $yaw(n-1)$ detected in the previous calculation. In a case of $|yaw(n)|>|yaw(n-1)|$, it is determined that the tires of the left and right front wheels FL and FR are gripping the road surface, and the routine is ended. In a case of $|yaw(n)|\leq|yaw(n-1)|$, it is determined that the tires of the left and right front wheels FL and FR are slipping and a yaw rate "yaw" is saturated, and the flow proceeds to step S6.

In step S6, a relative-to-lane yaw angle $\theta yaw$ [deg] is calculated. The relative-to-lane yaw angle $\theta yaw$ is an angle formed by a tangential line to the target track as the traveling track of the vehicle M, and a direction of travel of the vehicle-widthwise center of the vehicle M. That is, an intersection point of the tangential line to the target track at a current position of the vehicle M and the direction of travel of the vehicle-widthwise center of the vehicle M is obtained, in the case where the vehicle M illustrated in FIG. 5 is in the tendency to understeer, or in the case where the vehicle M illustrated in FIG. 6 is in the tendency to oversteer. Moreover, the relative-to-lane yaw angle $\theta yaw$ is calculated from $\theta yaw=\tan^{-1}(Ly/Lx)$ on the basis of a distance Lx and a distance Ly. The distance Lx is a distance from the intersection point to a predetermined point of gaze ahead in the direction of travel. The distance Ly is a distance of a perpendicular line extended from the point of gaze to the tangent line.

The flow proceeds to step S7, and it is checked whether or not an absolute value $|\theta yaw|$ of the relative-to-lane yaw angle $\theta yaw$ is a preset allowable yaw angle $\theta y0$ or smaller. In a case of $|\theta yaw|\leq\theta y0$, it is determined that the yaw behavior has not yet occurred, and the routine is ended. In a case of $|\theta yaw|>\theta y0$, it is determined that the yaw behavior is about to occur or has occurred, and the flow proceeds to step S8.

In step S8, a yaw behavior suppression control is carried out. The yaw behavior suppression control includes the same control as a known skid prevention device, or a vehicle dynamics control (VDC). For example, first, it is checked whether the relative-to-lane yaw angle $\theta yaw$ is outside the target track or whether the relative-to-lane yaw angle $\theta yaw$ is inside the target track. In a case where the relative-to-lane yaw angle $\theta yaw$ is outside the target track, it is determined that the vehicle M is in the tendency to understeer. Thus, a braking force is applied to the rear wheel on inner side of cornering, to bring the vehicle M into the tendency to oversteer. In a case where the relative-to-lane yaw angle $\theta yaw$ is inside the target track, it is determined that the vehicle M is in the tendency to oversteer. Thus, a braking force is applied to the front wheel on outer side of cornering, to bring the vehicle M into the tendency to understeer.

Thereafter, the flow proceeds to step S9, and it is checked whether or not the yaw behavior is suppressed in steps S9 and S10. That is, in step S9, first, a target yaw rate $ya0$ is set, with reference to, for example, the map data, on the basis of the curvature of the target track and the vehicle speed detected by the vehicle speed sensor 13.

Thereafter, a difference $(|yaw|-|ya0|)$ between an absolute value $|yaw|$ of the yaw rate "yaw" detected by the yaw rate sensor 12 and an absolute value $|ya0|$ of the target yaw rate $ya0$ as a reference is obtained. Comparison is made between the difference $(|yaw|-|ya0|)$ and a preset understeer determination value $ya1$. In a case of $(|yaw|-|ya0|)<ya1$, it is determined that the tendency to understeer has not been suppressed, and the flow proceeds to step S11. In step S11, understeer control processing is carried out, and the routine is ended. Thus, a normal steer-by-wire steering control is carried out.

In a case of $(|yaw|-|ya0|)>ya1$, the flow branches to step S10, and comparison is made between the difference $(|yaw|-|ya0|)$ and a preset oversteer determination value $ya2$. In a case of $(|yaw|-|ya0|)>ya2$, it is determined that the tendency to oversteer has not been suppressed, and the flow proceeds to step S12. In step S12, oversteer control processing is carried out, and the routine is ended. Thus, the normal steer-by-wire steering control is carried out.

In a case of ya1≤(|yaw|−|ya0|)≤ya2, it is determined that the yaw behavior is suppressed, and the routine is ended. Accordingly, in one embodiment of the disclosure, the DSS_ECU 11 in steps S9 and S10 may serve as a "vehicle behavior determination unit" configured to determine whether or not the vehicle M is taking the yaw behavior in the tendency to understeer or the tendency to oversteer.

Figure 3:
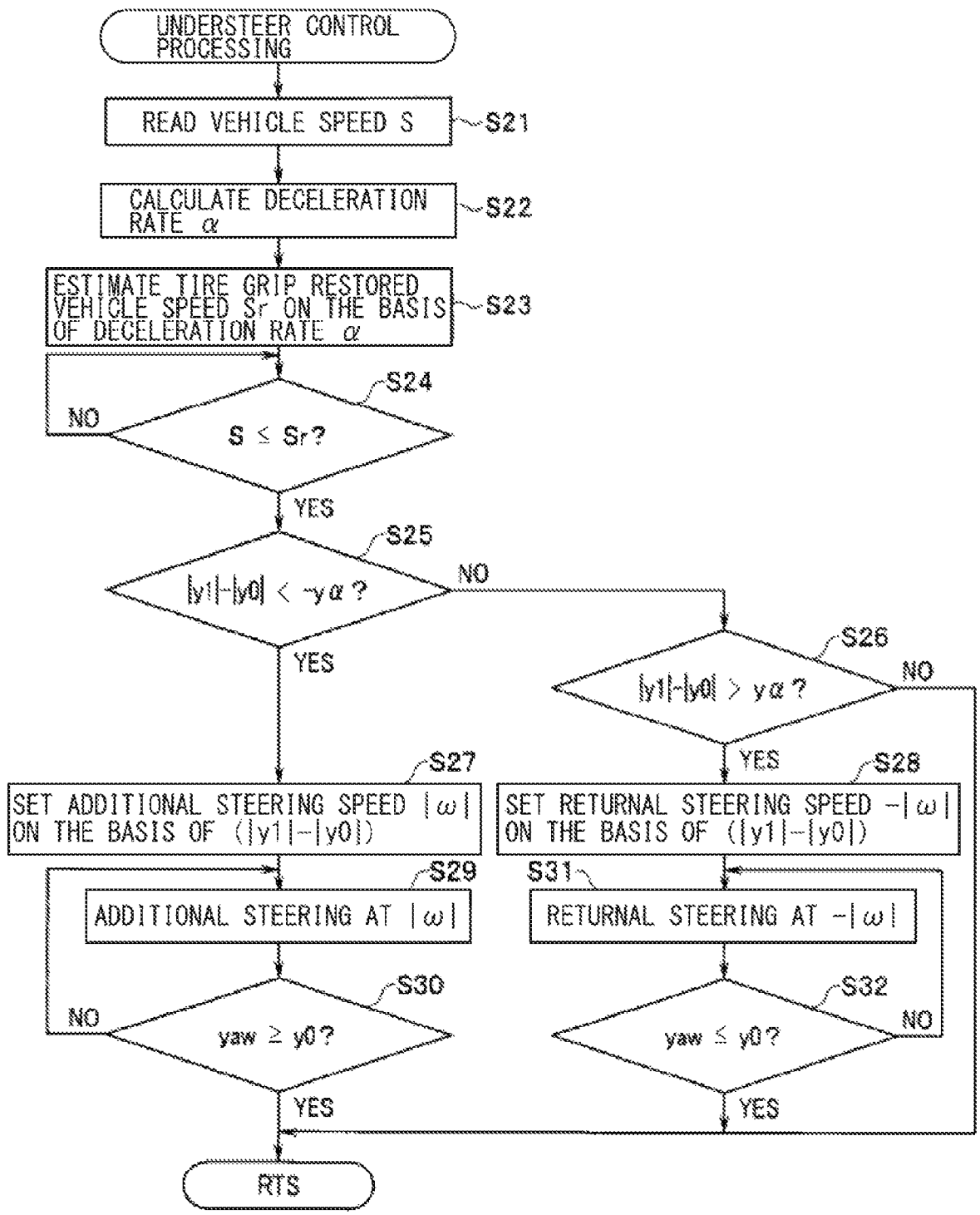
FIG. 3 is a flowchart of a routine of understeer control processing.

The understeer control processing in step S11 may be carried out in accordance with a subroutine of the understeer control processing illustrated in FIG. 3. In one embodiment of the disclosure, the DSS_ECU 11 in steps S11 and S12 described later may serve as a "vehicle behavior controller".

In this subroutine, first, in step S21, the vehicle speed S [m/s] detected by the vehicle speed sensor 13 is read. In step S22, the vehicle speed S is time-differentiated to calculate a deceleration rate, or a negative acceleration rate, a [m/s$^2$]. The deceleration rate a is an amount of torque reduction by traveling resistance in coasting, or an amount of torque reduction by the control by the traction control system (TCS). Accordingly, the deceleration rate a includes a factor of a coefficient of friction, i.e., a road surface u, between the tire and the road surface. In one embodiment of the disclosure, the DSS_ECU 11 in steps S22 and S42 described later may serve as a "deceleration rate detection unit".

Thereafter, the flow proceeds to step S23, and a tire grip restored vehicle speed Sr is estimated, with reference to table data on the basis of the deceleration rate a, or from a calculation expression. As mentioned above, because the deceleration rate a includes the factor of the road surface u, it is possible to estimate, to some extent, the tire grip restored vehicle speed Sr at which the tire grip is restored, from the deceleration rate a. The deceleration rate a and the tire grip restored vehicle speed Sr are proportional to each other. If the road surface u is low, the deceleration rate a becomes low, and the estimated tire grip restored vehicle speed Sr becomes low. If the road surface u is high, the deceleration rate a becomes high, and the estimated tire grip restored vehicle speed Sr becomes high. In one embodiment of the disclosure, the DSS_ECU 11 in steps S23 and S43 described later may serve as a "grip restored vehicle speed estimation unit".

Thereafter, the flow proceeds to step S24, and it is checked whether or not the vehicle speed S has reached the tire grip restored vehicle speed Sr. In a case where the vehicle speed S has not yet reached the tire grip restored vehicle speed Sr, the flow is on standby until the vehicle speed S reaches the tire grip restored vehicle speed Sr.

Thereafter, in a case where the vehicle speed S reaches the tire grip restored vehicle speed Sr, it is estimated that the grip force of the tire is restored, and the flow proceeds to step S25. In step S25, first, a grip restored target yaw rate y0 at which the tire grip is restored is set, with reference to, for example, the map data, on the basis of the curvature of the target track at the current position of the vehicle M and the tire grip restored vehicle speed Sr. Moreover, a grip restored estimated yaw rate y1 at which the grip force of the tire is restored is set, on the basis of the tire grip restored vehicle speed Sr and the steering angle θst detected by the second steering angle sensor 9b.

In a case where the vehicle M understeers, the left and right front wheels FL and FR are slightly additionally steered toward the target track (see FIG. 5). Accordingly, the estimated yaw rate y1 is set to a value that causes the vehicle M to be headed toward the target track. In one embodiment of the disclosure, the DSS_ECU 11 in steps S25 and S45 described later may serve as an "estimated yaw rate setting unit" and a "grip restored target yaw rate setting unit".

In steps S25 and S26, it is checked whether or not a difference (|y1|−|y0|) between an absolute value |y1| of the estimated yaw rate y1 and an absolute value |y0| of the target yaw rate y0 falls within a range of an allowable value ±yα.

First, in step S25, it is checked whether or not the difference (|y1|−|y0|) is lower than an allowable lower limit value −yα. In step S26, it is checked whether or not the difference (|y1|−|y0|) is higher than an allowable upper limit value yα. In a case with a determination that (|y1|−|y0|)<−yα is satisfied, it is determined that the tendency to understeer is furthered on the occasion of the restoration of the grip force of the tire, and the flow proceeds to step S27.

In a case of (|y1|−|y0|)≥−yα, the flow branches to step S26, and it is checked whether or not the difference (|y1|−|y0|) is greater than the allowable upper limit value yα. In a case of (|y1|−|y0|)<−yα, it is determined that the vehicle M is brought into the tendency to oversteer on the occasion of the restoration of the grip force of the tire, and the flow proceeds to step S28.

In a case of −yα≤(|y1|−|y0|)≤yα, it is determined that the vehicle M travels along the target track on the occasion of the restoration of the grip force of the tire, and the routine is ended.

Meanwhile, the flow proceeds from step S25 to step S27, and thereupon, on the basis of the difference (|y1|−|y0|), an additional steering speed |ω| corresponding to the difference (|y1|−|y0|) is obtained with reference to the table data or from the calculation expression. As to relation between the difference (|y1|−|y0|) and the additional steering speed |ω|, as the difference (|y1|−|y0|) is greater, the additional steering speed |ω| is set to a higher value. As the difference (|y1|−|y0|) is smaller, the additional steering speed |ω| is set to a lower value. As the difference (|y1|−|y0|) is greater, raising the additional steering speed |ω| makes it possible to suppress the unstable behavior at an early stage.

Thereafter, the flow proceeds to step S29, and the steering motor 5 is driven at the additional steering speed |ω|, causing additional steering of the left and right front wheels FL and FR. Thereafter, the flow proceeds to step S30, and it is checked whether or not the yaw rate "yaw" detected by the yaw rate sensor 12 has reached the target yaw rate y0. The processes of steps S29 and S30 are repeated until the yaw rate "yaw" reaches the target yaw rate y0. In a case where the yaw rate "yaw" reaches the target yaw rate y0 (yaw≥y0), the additional steering of the left and right front wheels FL and FR is stopped, and the routine is ended.

Meanwhile, the flow proceeds from step S26 to step S28, and thereupon, on the basis of the difference (|y1|−|y0|), a returnal steering speed −|ω| corresponding to the difference (|y1|−|y0|) is obtained with reference to the table data or from the calculation expression. As to relation between the difference (|y1|−|y0|) and the returnal steering speed −|ω|, as the difference (|y1|−|y0|) is greater, the returnal steering speed −|ω| is set to a higher value. As the difference (|y1|−|y0|) is smaller, the returnal steering speed −|ω| is set to a lower value. As the difference (|y1|−|y0|) is greater, raising the returnal steering speed −|ω| makes it possible to suppress the unstable behavior at an early stage.

Thereafter, the flow proceeds to step S31, and the steering motor 5 is driven at the returnal steering speed −|ω|, causing returnal steering of the left and right front wheels FL and FR. Thereafter, the flow proceeds to step S32, and it is checked whether or not the yaw rate "yaw" detected by the yaw rate sensor 12 has reached the target yaw rate y0. The processes of steps S31 and S32 are repeated until the yaw rate "yaw" reaches the target yaw rate y0. In a case where the yaw rate "yaw" reaches the target yaw rate y0 (yaw≥y0), the returnal steering of the left and right front wheels FL and FR is stopped, and the routine is ended. In one embodiment of the disclosure, the DSS_ECU 11 in steps S27 to S32 and the DSS_ECU 11 in steps S47 to S52 described later may serve as a "steering control unit".

The steering motor 5 operates irrespective of the driver's intention, while the reaction force corresponding to the steering operation by the driver is applied to the steering wheel 3 by the reaction force motor 4. Accordingly, the steering motor 5 being driven does not make the driver feel uncomfortable.

Figure 4:
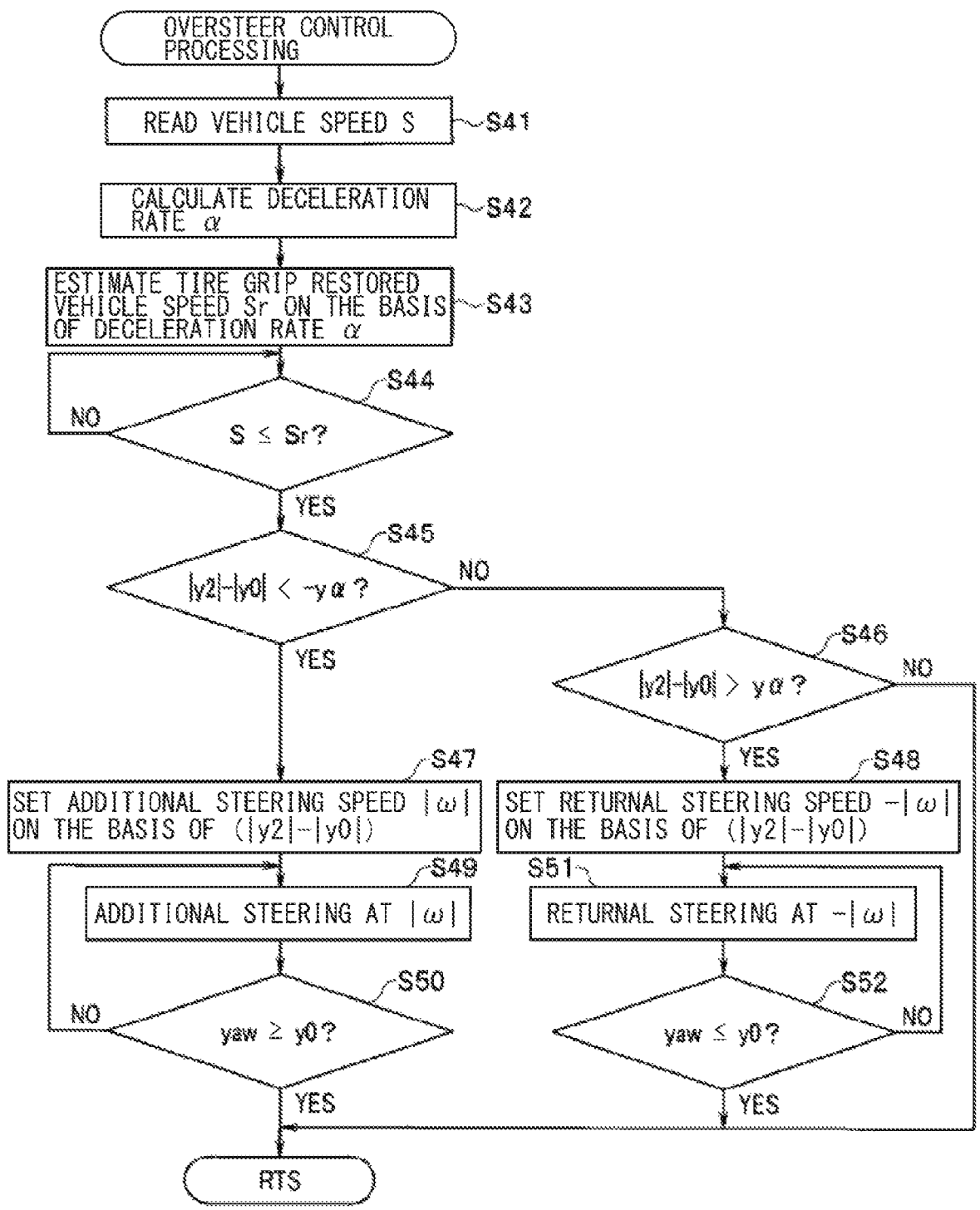
FIG. 4 is a flowchart of a routine of oversteer control processing.

The oversteer control processing in step S12 of FIG. 2 is carried out in accordance with a subroutine of the oversteer control processing illustrated in FIG. 4.

In the subroutine, processes of steps S41 to S44 are the same as those of steps S21 to S24 of the subroutine of the understeer control processing described above.

The flow proceeds to step S45, and the target yaw rate y0 is set with reference to, for example, the table data, on the basis of the curvature of the target track at the current position of the vehicle M and the tire grip restored vehicle speed Sr. Moreover, an estimated yaw rate y2 on the occasion of the restoration of the grip force of the tire is set on the basis of the tire grip restored vehicle speed Sr and the steering angle θst detected by the second steering angle sensor 9b. In the case where the vehicle M oversteers, the left and right front wheels FL and FR are slightly counter-steered toward the target track (see FIG. 6). Accordingly, the estimated yaw rate y2 is set to a value that causes the vehicle M to be headed toward the target track.

Thereafter, in steps S45 and S46, it is checked whether or not a difference (|y2|−|y0|) between an absolute value |y2| of the estimated yaw rate y2 and the absolute value |y0| of the target yaw rate y0 falls within the range of the allowable value ±yα.

First, in step S45, it is checked whether or not the difference (|y2|−|y0|) is lower than the allowable lower limit value −yα. In step S46, it is checked whether or not the difference (|y2|−|y0|) is higher than the allowable upper limit value yα. In a case with a determination that (|y2|−|y0|)<−yα is satisfied, it is determined that the tendency to oversteer is furthered on the occasion of the restoration of the grip force of the tire, and the flow proceeds to step S47.

In a case of (|y2|−|y0|)>yα, the flow branches to step S46, and it is checked whether or not the difference (|y2|−|y0|) is greater than the allowable upper limit value yα. In a case of (|y2|−|y0|)<−yα, it is determined that the vehicle M is brought into the tendency to oversteer on the occasion of the restoration of the grip force of the tire, and the flow proceeds to step S48.

In a case of −yα≤(|y2|−|y0|)≤yα, it is determined that the vehicle M travels along the target track on the occasion of the restoration of the grip force of the tire, and the routine is ended.

Meanwhile, the flow proceeds from step S45 to step S47, and thereupon, on the basis of the difference (|y2|−|y0|), the additional steering speed |ω| corresponding to the difference (|y2|−|y0|) is obtained with reference to the table data or from the calculation expression. As to relation between the difference (|y2|−|y0|) and the additional steering speed |ω|, as the difference (|y2|−|y0|) is greater, the additional steering speed |ω| is set to a higher value. As the difference (|y2|−|y0|) is smaller, the additional steering speed |ω| is set to a lower value. As the difference (|y2|−|y0|) is greater, raising the additional steering speed |ω| makes it possible to suppress the unstable behavior at an early stage.

Thereafter, the flow proceeds to step S49, and the steering motor 5 is driven at the additional steering speed |ω|, causing the additional steering of the left and right front wheels FL and FR.

Thereafter, the flow proceeds to step S50. As with step S30 of the subroutine of the understeer control processing described above, it is checked whether or not the yaw rate "yaw" detected by the yaw rate sensor 12 has reached the target yaw rate y0. The processes of steps S49 and S50 are repeated until the yaw rate "yaw" reaches the target yaw rate y0. In a case where the yaw rate "yaw" reaches the target yaw rate y0 (yaw≥y0), the additional steering of the left and right front wheels FL and FR is stopped, and the routine is ended.

Meanwhile, the flow proceeds from step S46 to step S48, and thereupon, on the basis of the difference (|y2|−|y0|), the returnal steering speed −|ω| corresponding to the difference (|y2|−|y0|) is obtained with reference to the table data or from the calculation expression. As to relation between the difference (|y2|−|y0|) and the returnal steering speed −|ω|, as the difference (|y2|−|y0|) is greater, the returnal steering speed −|ω| is set to a higher value. As the difference (|y2|−|y0|) is smaller, the returnal steering speed −|ω| is set to a lower value. As the difference (|y2|−|y0|) is greater, raising the returnal steering speed −|ω| makes it possible to suppress the unstable behavior at an early stage.

Thereafter, the flow proceeds to step S51, and the steering motor 5 is driven at the returnal steering speed −|ω|, causing the returnal steering of the left and right front wheels FL and FR. Thereafter, the flow proceeds to step S52. As with step S32 of the subroutine of the understeer control processing described above, it is checked whether or not the yaw rate "yaw" detected by the yaw rate sensor 12 has reached the target yaw rate y0. The processes of steps S51 and S52 are repeated until the yaw rate "yaw" reaches the target yaw rate y0. In a case where the yaw rate "yaw" reaches the target yaw rate y0 (yaw≥y0), the returnal steering of the left and right front wheels FL and FR is stopped, and the routine is ended. In this case as well, because the steering motor 5 operates irrespective of the driver's intention, the steering motor 5 being driven does not make the driver feel uncomfortable.

As described, in this embodiment, in the case where the vehicle M is brought into the tendency to understeer or the tendency to oversteer while traveling along the curved road, the DSS ECU 11 obtains the tire grip restored vehicle speed Sr, i.e., the vehicle speed Sr at which the grip force of the tire is restored, on the basis of the deceleration rate a of the vehicle M. Upon the vehicle speed S reaching the tire grip restored vehicle speed Sr, the DSS_ECU 11 sets the target yaw rate y0 on the basis of the curvature of the current target track and the tire grip restored vehicle speed Sr.

Moreover, the DSS_ECU 11 obtains the estimated yaw rates y1 and y2 on the occasion of the restoration of the grip force of the tire, on the basis of the tire grip restored vehicle speed Sr and the steering angle θst detected by the second steering angle sensor 9b. Thus, the DSS_ECU 11 additional steers or steers back the left and right front wheels FL and FR, to settle the estimated yaw rates y1 and y2 within the range of the predetermined allowable value ±yα with respect to the target yaw rate y0.

As a result, on the occasion of the restoration of the grip force of the tire, it is possible to restore the grip force of the tire, with the behavior of the vehicle M determined. Moreover, the steer-by-wire system is adopted in which the reaction force acting on the steering wheel 3 gripped by the driver is driven by the reaction force motor 4, while the left and right front wheels FL and FR are driven by the steering motor 5. This causes no hindrance to the operation of the steering wheel 3 by the driver. Hence, it is possible to obtain stable vehicle behavior on the occasion of the restoration of the grip force of the tire when the driver additionally turns the steering wheel 3 or when the driver turns the steering wheel 3 back. It is possible to prevent in advance the driver from feeling uncomfortable or anxious.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the disclosure is applicable to a case where the vehicle M is a front-wheel drive vehicle or a rear-wheel drive vehicle. Moreover, the steer-by-wire system may be provided by allowing a multi-plate clutch to bring the steering shaft 2*a* and the pinion shaft 2*b* into contact or out of contact. In this case, the reaction force is given to the steering wheel 3 by adjusting a friction force of the multi-plate clutch.

As described, according to the disclosure, in a case where a vehicle exhibits yaw behavior while traveling along a curved road, a tire grip restored vehicle speed is estimated on the basis of a deceleration rate. On the occasion that a vehicle speed lowers to the tire grip restored vehicle speed, an estimated yaw rate that acts on the vehicle is set on the basis of the vehicle speed and a steering angle. A grip restored target yaw rate is set on the basis of a curvature and the tire grip restored vehicle speed. On the basis of a difference between the estimated yaw rate and the grip restored target yaw rate, a steering control is made to settle the yaw rate of the vehicle at the grip restored target yaw rate. Hence, it is possible to obtain stable vehicle behavior on the occasion of restoration of a grip force of a tire when a driver additionally turns a steering wheel or when a driver turns the steering wheel back, without making the driver feel uncomfortable or anxious.

The DSS ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the DSS_ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the DSS_ECU 11 illustrated in FIG. 1.

The invention claimed is:

1. A behavior control apparatus for a vehicle, the behavior control apparatus comprising:
   a vehicle speed detector configured to detect a vehicle speed of the vehicle;
   a curvature setting unit configured to set a curvature on a basis of a track to be traveled by the vehicle;
   a steering angle detector configured to detect a steering angle of a steering wheel of the vehicle;
   a yaw rate detector configured to detect a yaw rate that acts on the vehicle;
   a deceleration rate detection unit configured to detect a deceleration rate from a change in the vehicle speed;
   a target yaw rate setting unit configured to set a target yaw rate on a basis of the vehicle speed and the curvature;
   a vehicle behavior determination unit configured to determine whether the vehicle is taking yaw behavior in a tendency to oversteer or a tendency to understeer, from a difference between the yaw rate and the target yaw rate; and
   a vehicle behavior controller configured to control behavior of the vehicle on a condition that the vehicle behavior determination unit determines that the vehicle is taking the yaw behavior, the vehicle behavior controller comprising:
      a grip restored vehicle speed estimation unit configured to estimate a tire grip restored vehicle speed at which tire grip is restored, on a basis of the deceleration rate;
      an estimated yaw rate setting unit configured to set an estimated yaw rate that acts on the vehicle, on a basis of the vehicle speed and the steering angle, on an occasion that the vehicle speed lowers to the tire grip restored vehicle speed;
      a grip restored target yaw rate setting unit configured to set a grip restored target yaw rate at which the tire grip is restored, on a basis of the curvature and the tire grip restored vehicle speed; and
      a steering control unit configured to make a steering control including allowing the yaw rate of the vehicle to settle at the grip restored target yaw rate, on a basis of a difference between the estimated yaw rate and the grip restored target yaw rate.

2. The behavior control apparatus for the vehicle according to claim 1, wherein
   the steering control unit is configured to set a steering speed that allows the yaw rate of the vehicle to settle at the grip restored target yaw rate, on a basis of the difference between the estimated yaw rate and the grip restored target yaw rate.

3. The behavior control apparatus for the vehicle according to claim 1, wherein
   on a condition that the estimated yaw rate is lower than the grip restored target yaw rate, the steering control unit is configured to increase the steering angle.

4. The behavior control apparatus for the vehicle according to claim 2, wherein
   on a condition that the estimated yaw rate is lower than the grip restored target yaw rate, the steering control unit is configured to increase the steering angle.

5. The behavior control apparatus for the vehicle according to claim 1, wherein
   on a condition that the estimated yaw rate is higher than the grip restored target yaw rate, the steering control unit is configured to decrease the steering angle.

6. The behavior control apparatus for the vehicle according to claim 2, wherein on a condition that the estimated yaw rate is higher than the grip restored target yaw rate, the steering control unit is configured to decrease the steering angle.

7. The behavior control apparatus for the vehicle according to claim 3, wherein
on a condition that the estimated yaw rate is higher than the grip restored target yaw rate, the steering control unit is configured to decrease the steering angle.

8. The behavior control apparatus for the vehicle according to claim 4, wherein
on a condition that the estimated yaw rate is higher than the grip restored target yaw rate, the steering control unit is configured to decrease the steering angle.

9. The behavior control apparatus for the vehicle according to claim 1, wherein
the steering control unit is configured to make the steering control with a steering motor independent from a motor for a steering wheel.

10. The behavior control apparatus for the vehicle according to claim 2, wherein
the steering control unit is configured to make the steering control with a steering motor independent from a motor for a steering wheel.

11. The behavior control apparatus for the vehicle according to claim 3, wherein
the steering control unit is configured to make the steering control with a steering motor independent from a motor for a steering wheel.

12. The behavior control apparatus for the vehicle according to claim 4, wherein
the steering control unit is configured to make the steering control with a steering motor independent from a motor for a steering wheel.

13. The behavior control apparatus for the vehicle according to claim 5, wherein
the steering control unit is configured to make the steering control with a steering motor independent from a motor for a steering wheel.

14. The behavior control apparatus for the vehicle according to claim 6, wherein
the steering control unit is configured to make the steering control with a steering motor independent from a motor for a steering wheel.

15. The behavior control apparatus for the vehicle according to claim 7, wherein
the steering control unit is configured to make the steering control with a steering motor independent from a motor for a steering wheel.

16. The behavior control apparatus for the vehicle according to claim 8, wherein
the steering control unit is configured to make the steering control with a steering motor independent from a motor for a steering wheel.

17. A behavior control apparatus for a vehicle, the behavior control apparatus comprising:
a vehicle speed sensor configured to detect a vehicle speed of the vehicle;
a steering angle sensor configured to detect a steering angle of a steering wheel of the vehicle;
a yaw rate sensor configured to detect a yaw rate that acts on the vehicle; and
circuitry configured to
set a curvature on a basis of a track to be traveled by the vehicle,
detect a deceleration rate from a change in the vehicle speed,
set a target yaw rate on a basis of the vehicle speed and the curvature,
determine whether the vehicle is taking yaw behavior in a tendency to oversteer or a tendency to understeer, from a difference between the yaw rate and the target yaw rate, and
control behavior of the vehicle on a condition that the circuitry determines that the vehicle is taking the yaw behavior,
the circuitry being configured to:
estimate a tire grip restored vehicle speed at which tire grip is restored, on a basis of the deceleration rate;
set an estimated yaw rate that acts on the vehicle, on a basis of the vehicle speed and the steering angle, on an occasion that the vehicle speed lowers to the tire grip restored vehicle speed;
set a grip restored target yaw rate at which the tire grip is restored, on a basis of the curvature and the tire grip restored vehicle speed; and
make a steering control including allowing the yaw rate of the vehicle to settle at the grip restored target yaw rate, on a basis of a difference between the estimated yaw rate and the grip restored target yaw rate.

\* \* \* \* \*